(12) United States Patent
Klement et al.

(10) Patent No.: US 8,820,488 B2
(45) Date of Patent: Sep. 2, 2014

(54) BRAKE LINING ASSEMBLY

(75) Inventors: Roland Klement, Haunshofen (DE); Rudolf Fischer, Erding (DE); Tobias Linke, Bad Vilbel (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 744 days.

(21) Appl. No.: 12/114,224

(22) Filed: May 2, 2008

(65) Prior Publication Data

US 2008/0264742 A1 Oct. 30, 2008

Related U.S. Application Data

(63) Continuation of application No. PCT/EP2006/010516, filed on Nov. 2, 2006.

(30) Foreign Application Priority Data

Nov. 3, 2005 (DE) .......................... 10 2005 052 438

(51) Int. Cl.
*F16D 55/00* (2006.01)

(52) U.S. Cl.
USPC ...................................... 188/73.31; 188/71.1

(58) Field of Classification Search
USPC ...................................................... 188/73.31
See application file for complete search history.

(56) References Cited

U.S. PATENT DOCUMENTS

| 3,442,354 | A | | 5/1969 | Belart | |
|---|---|---|---|---|---|
| 3,605,956 | A | | 9/1971 | Hahm et al. | |
| 4,168,767 | A | * | 9/1979 | Brimaud | 188/76 |
| 4,498,564 | A | * | 2/1985 | Tamura | 188/73.32 |
| 4,570,759 | A | * | 2/1986 | Ferret Bofill et al. | 188/73.32 |
| 4,860,865 | A | * | 8/1989 | Montalvo et al. | 192/70 |
| 5,205,383 | A | * | 4/1993 | Terashima | 188/73.45 |
| 5,538,105 | A | * | 7/1996 | Rike | 188/73.32 |
| 5,799,754 | A | * | 9/1998 | Kazuro et al. | 188/1.11 W |
| 5,875,873 | A | * | 3/1999 | Kay et al. | 188/73.38 |
| 6,068,091 | A | * | 5/2000 | Finley | 188/73.31 |
| 6,302,243 | B1 | * | 10/2001 | Ruiz | 188/73.1 |
| 7,137,488 | B2 | * | 11/2006 | Gilliland | 188/73.47 |
| 7,438,161 | B2 | * | 10/2008 | Burgoon et al. | 188/73.32 |

(Continued)

FOREIGN PATENT DOCUMENTS

| DE | 1600120 | 1/1970 |
|---|---|---|
| DE | 1775586 | 10/1970 |

(Continued)

OTHER PUBLICATIONS

International Search Report dated Feb. 6, 2007 with English Translation of Relevant portion (Four (4) pages).

(Continued)

*Primary Examiner* — Robert A Siconolfi
*Assistant Examiner* — James Hsiao
(74) *Attorney, Agent, or Firm* — Crowell & Moring LLP

(57) ABSTRACT

A brake lining assembly for a disc brake is configured for road vehicles and includes a brake caliper and brake linings located on either side of the brake disc. An unchecked dismantling of the brake linings is effectively prevented by having a mounting assembly formed from the two brake linings and the lining retaining bracket. To achieve this, the end regions of the lining retaining bracket are connected to at least one of the brake linings in a positive fit.

32 Claims, 2 Drawing Sheets

(56) References Cited

U.S. PATENT DOCUMENTS

| | | |
|---|---|---|
| 8,453,804 B2 * | 6/2013 | Pfister .................. 188/73.32 |
| 2004/0074711 A1 * | 4/2004 | Baylis .................. 188/73.31 |
| 2004/0079596 A1 * | 4/2004 | Roberts et al. ............ 188/73.31 |
| 2004/0168868 A1 * | 9/2004 | Thomas .................. 188/73.37 |
| 2004/0222052 A1 * | 11/2004 | McCann et al. ........... 188/73.31 |

FOREIGN PATENT DOCUMENTS

| | | |
|---|---|---|
| DE | 2545748 C3 | 5/1976 |
| DE | 10 2004 002 571 A1 | 12/2004 |
| EP | 0 703 378 B1 | 3/1996 |
| EP | 0984188 A2 | 3/2000 |
| GB | 863851 | 3/1961 |

OTHER PUBLICATIONS

German office action dated Jul. 26, 2006.
German Office Action dated Jun. 24, 2009 with English translation (five (5) pages).

* cited by examiner

BRAKE LINING ASSEMBLY

This application is a continuation of international application PCT/EP2006/010516, filed Nov. 2, 2006, the entire disclosure of which is incorporated herein by reference, and claims priority to German patent application 10 2005 052 438.9, filed Nov. 3, 2005.

Cross-reference is hereby made to the U.S. national phase applications of international applications PCT/EP2006/010517 (published as WO 2007/051618 A1 on May 10, 2007) and PCT/EP2006/010512 (published as WO 2007/051613 A1 on May 10, 2007).

BACKGROUND AND SUMMARY OF THE INVENTION

This invention relates to a brake lining assembly for a disk brake for road vehicles, having a brake caliper provided with brake lining shafts, into which, in each case, one brake lining and, optionally, one pressure distributor plate can be inserted. The brake linings arranged on both sides of the brake disk are secured by way of a lining holding bracket connected to the brake caliper and acting on a prestressed leaf spring that is pressed onto the circumferential face of the lining carrier from the brake lining.

In previously known brake lining assemblies, connections between the lining carriers of the brake linings have been designed in such a way that the brake linings can be removed from the brake caliper or from the brake housing in an uncontrolled manner. Moreover, the brake linings have to be mounted individually. As the manufacturer of brakes has to offer a guarantee, since the brake linings can be removed in an uncontrolled manner, manipulations are possible. As a result, it may no longer be possible to check, in connection with the brake manufacturer guarantee, whether, for example, faulty mounting of the brake on the axle, contrary to instructions and requirements, has taken place.

One object of this invention is the object of designing a brake lining assembly, which will be described in greater detail, in such a way that mounting is simplified, and so that there are certain positive checking possibilities for the brake manufacturer when a guarantee is to be fulfilled.

Such an object is achieved by having one of the brake linings movable relative to the other brake lining by way of a displaceable tongue and groove connection formed between the movable brake lining and, optionally, the holding spring on one side and the lining holding bracket on the other side, or by way of a slot penetrated by a T attachment on the lining carrier or on the holding spring formed in the lining holding bracket. Displaceability of the brake application-side lining, which is necessary for braking operations, is ensured in a simple manner in this way, and, in addition, a mounting unit that simplifies both construction and mounting can be realized.

Furthermore, at least one of the two brake linings to be arranged on both sides of the brake disk and the lining holding bracket, or both brake linings and the lining holding bracket, preferably form the mounting structural unit.

The mounting structural unit makes it possible to provide one or both brake linings and the lining holding bracket, and optionally the holding spring, if present, as one structural unit for mounting. This type of mounting is simple. Moreover, the unit makes possible the detection of the different wear of the brake linings, which are arranged on both sides of the brake disk. Additionally, faulty mounting of the brake on the axle, contrary to specifications, can also be detected. If both linings are premounted together, compact packaging across the axle can be realized by pushing two premounted units into one another, packaging, and then transporting the linings together to the mounting location.

In order to realize the displaceability required for brake operations, it is advantageous if one of the linings can be moved relative to the other. A structurally simple, operationally reliable solution is achieved by a displaceable tongue and groove connection, which is arranged between the movable brake lining or its holding spring and the lining holding bracket. As an alternative, however, a structurally simple solution is also realized if the slot, which is penetrated by a T attachment on the lining carrier or the holding spring, is formed in the lining holding bracket.

Formation of the mounting structural group can be implemented, in structural terms, in a very simple way if it is formed by positive connections between the lining carriers of the brake linings and the lining holding bracket. The positive connections ensure, firstly, that the brake linings with the lining holding bracket can be removed only as one structural unit, and that mounting on the brake application unit can be configured in such a way that dismantling is possible only by destruction. So that the brake linings do not slide off the lining holding bracket, the lining holding bracket has a stop in every end region for axially delimiting the movements of the brake linings. This stop should be designed in such a way that it cannot be dismantled. In a particularly advantageous design, each stop is formed by cold working the associated region of the lining holding bracket. This can take place, for example, by stamping.

The mounting unit is configured in such a way that it can be fixed on the brake caliper in a simple way, with the result that it is held on the brake caliper.

There is also provision in a further embodiment for an end region of the lining holding bracket to lie within the brake caliper, and for the region that lies facing away from the brake caliper to engage into a holding shoe. Type-dedicated or customer-specific variants can be produced by the structural design of the lining holding bracket. The lining holding bracket is fixed on the side which lies opposite the brake caliper by the holding shoe. The design should be selected in such a way that brakes, which are designed for specific types or customers, cannot be swapped by mistake.

In a further preferred embodiment, the lining holding bracket can be configured as a flat part. The lining holding bracket is bent over in the end regions, which results in the type-dedicated or customer-specific design in a very simple way. Those regions of the lining holding bracket that are assigned to the lining carriers are connected to the lining holding bracket via holding springs. These holding springs are connected fixedly to the lining carriers of the brake linings by way of mechanical connecting elements. Connecting elements of this type may, for example, be rivets.

The lining holding bracket is preferably provided with an identification in the form of a letter and/or number combination and/or symbols. As a result, the brake linings can be allocated without doubt and unambiguously to the specific brake by a corresponding entry in a data bank. Manipulations can therefore be detected.

The invention will be described in greater detail with reference the appended drawings.

DETAILED DESCRIPTION OF THE INVENTION

Figure 1:
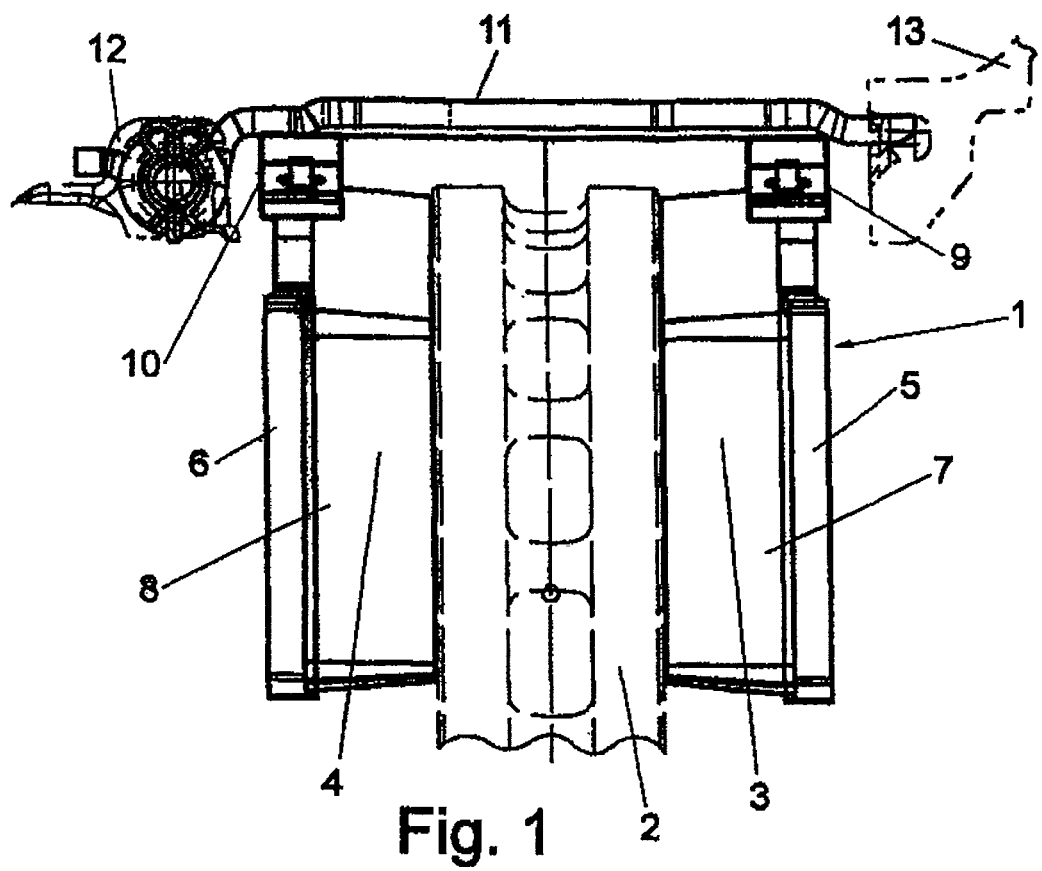
FIG. 1 shows a disk brake in a partial front view.
Figure 2:
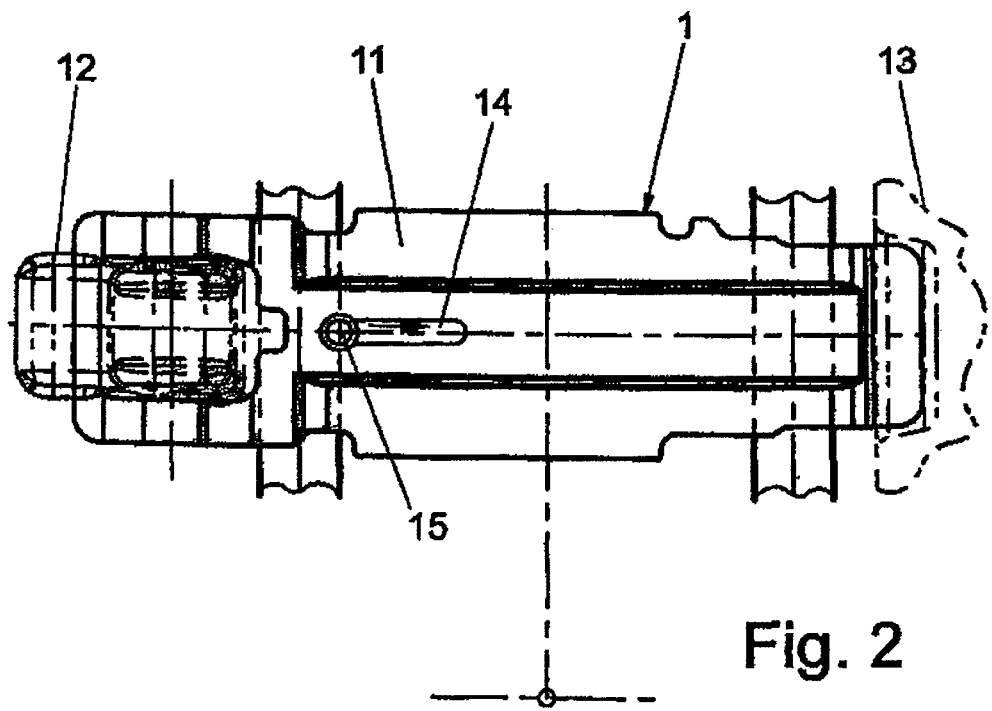
FIG. 2 is a partial plan view, which corresponds to FIG. 1.

The disk brake 1, which is shown partially in FIGS. 1 and 2, comprises a brake disk 2 provided with a circumferential groove in the central region. Two brake linings 3, 4, which comprise, in each case, a lining carrier 5, 6 and the brake materials 7, 8, are arranged on both sides of the brake disk 2.

The lining carriers 5, 6 are connected positively to a lining holding bracket 11 via leaf spring-like holding springs 9, 10 and form an assembled structural unit held on the brake caliper 12. The holding springs 9, 10 are preferably connected fixedly to the lining carriers 5, 6 in such a way that they can be released from the lining carrier 5, 6 only by destruction.

This lining holding bracket 11 engages into the brake caliper 12 (shown in basic form) by way of its left-hand end region in the illustration, while the opposite end engages into a holding shoe 13. The lining holding bracket 11 is configured as a flat part and is bent over in the end regions. The positive connections between the lining carriers 5, 6 and the lining holding bracket 11 are achieved by this bent over section in conjunction with the holding springs 9, 10. In the exemplary embodiment which is shown, moreover, the bent over end regions achieve a situation in which the brake linings 3, 4 can be moved excessively far from one another with their lining carriers 5, 6.

FIGS. 1 and 2 show that the brake linings 3, 4 and the lining holding bracket 11 form a mounting structural unit that can be dismantled only in its entirety. After dismantling, faulty mounting or inappropriate handling contrary to unambiguous instructions or stipulations can be shown at any time via the corresponding precautions which have already been mentioned.

Figure 3:
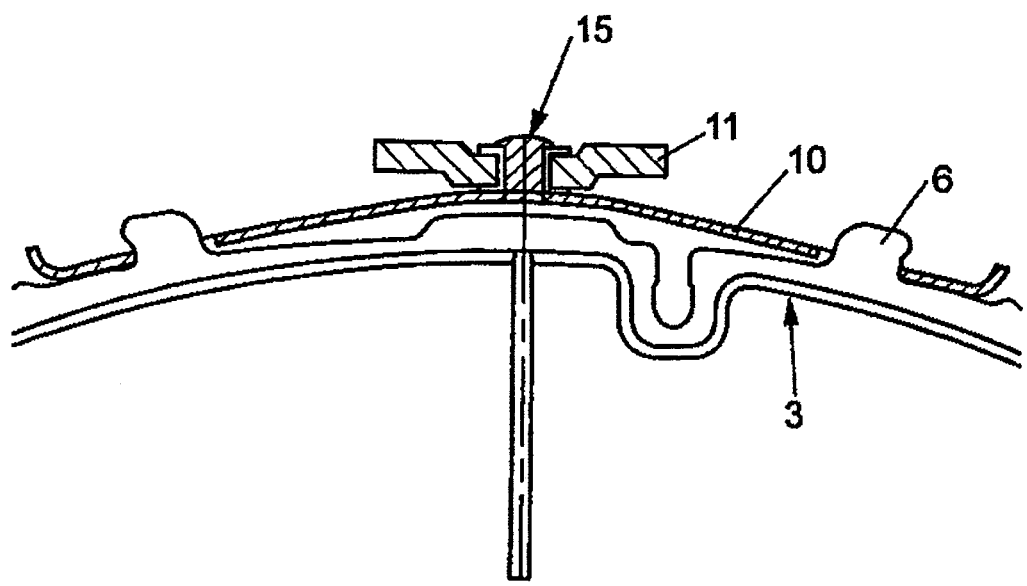
FIG. 3 is a partial view of the brake application-side lining on the lining holding bracket.

According to FIG. 3, the brake lining 4 is attached movably to the brake lining assembly by virtue of the fact that a slot 14, which is penetrated by a T attachment 15 on the lining carrier (and/or on the holding spring 10), is formed in the lining holding bracket 11 in order, in this way, to ensure the displaceability of the brake application-side lining, which is necessary for brake operations.

The invention is not restricted to the exemplary embodiment shown. It is essential only that one mounting structural unit is formed from the brake linings 3, 4 and the lining holding bracket 11 by connecting the end regions of the lining holding bracket 11 positively to the brake linings 3, 4 and, in particular, to the lining carriers 5, 6, so that the brake linings cannot be dismantled individually. It can be proven by the corresponding positive connections that faulty mounting of the brake might exist, and that the relevant stipulations have not been followed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A brake lining assembly for a disk brake for road vehicles, having a brake caliper into which brake linings can be inserted, comprising:
   a lining holding bracket by which the brake linings are arranged and secured on both sides of a brake disk, the lining holding bracket being connected to the brake caliper, and
   at least one prestressed leaf holding spring on which the lining holding bracket acts and which is pressed onto at least one circumferential face of lining carriers for the brake linings,
   wherein only one of the brake linings is movable toward and away from the other brake lining by movement of an attachment formed by the holding spring that is received for displacement between ends of an elongated oblong slot formed in the lining holding bracket.

2. The brake lining assembly as claimed in claim 1, wherein at least one of the brake linings is fastened to the lining holding bracket, and wherein at least one of the brake linings forms an assembly structural unit with the lining holding bracket.

3. The brake lining assembly as claimed in claim 2, wherein the assembly structural unit is formed by positive connections between the lining carriers for the brake linings and the lining holding bracket.

4. The brake lining assembly as claimed in claim 1, wherein the lining holding bracket has stops in end regions thereof for axially delimiting movements of the brake linings.

5. The brake lining assembly as claimed in claim 4, wherein each stop is a cold worked stop at an associated region of the lining holding bracket.

6. The brake lining assembly as claimed in claim 1, wherein the lining holding bracket is held on the brake caliper.

7. The brake lining assembly as claimed in claim 1, wherein an end region of the lining holding bracket lies within the brake caliper, and wherein an end region that lies opposite the brake caliper engages into a holding shoe.

8. The brake lining assembly as claimed in claim 1, wherein end regions of the lining holding bracket are configured such that they are type-dedicated or customer-specific.

9. The brake lining assembly as claimed in claim 1, wherein the lining holding bracket is configured as a flat part.

10. The brake lining assembly as claimed in claim 1, wherein end regions of the lining holding bracket are connected by multiple holding springs to the brake linings.

11. The brake lining assembly as claimed in claim 5, wherein the cold working is accomplished by stamping.

12. The brake lining assembly as claimed in claim 10, wherein the end regions are connected by the holding springs to the lining carriers for the brake linings.

13. The brake lining assembly as claimed in claim 8, wherein each holding spring is connected by a mechanical connecting element to one of the lining carriers of the brake linings.

14. The brake lining assembly as claimed in claim 1, wherein the lining holding bracket is provided with identification in the form of letter and/or number combinations and/or symbols.

15. The brake lining assembly as claimed in claim 1, wherein one of the brake linings is guided so that it can move relative to the other.

16. A brake lining assembly for a disk brake for road vehicles, having a brake caliper into which brake linings and, optionally, at least one pressure distributor plate can be inserted, comprising:
   a lining holding bracket by which the brake linings are arranged and secured on both sides of the brake disk, the lining holding bracket being connected to the brake caliper, and
   at least one prestressed leaf holding spring on which the lining holding bracket acts and which is pressed onto circumferential faces of lining carriers for the brake linings, wherein only one of the brake linings is movable toward and away from the other brake lining by movement of an attachment formed by the holding spring that is received for displacement between ends of an elongated oblong slot formed in the lining holding bracket.

17. The brake lining assembly as claimed in claim 16, wherein at least one of the brake linings is fastened to the lining holding bracket, and wherein at least one of the brake linings forms an assembly structural unit with the lining holding bracket.

18. The brake lining assembly as claimed in claim 17, wherein the assembly structural unit is formed by positive connections between the lining carriers for the brake linings and the lining holding bracket.

19. The brake lining assembly as claimed in claim 16, wherein the lining holding bracket has stops in end regions thereof for axially delimiting movements of the brake linings.

20. The brake lining assembly as claimed in claim 19, wherein each stop is a cold worked stop at an associated region of the lining holding bracket.

21. The brake lining assembly as claimed in claim 16, wherein the lining holding bracket is held on the brake caliper.

22. The brake lining assembly as claimed in claim 16, wherein an end region of the lining holding bracket lies within the brake caliper, and wherein an end region that lies opposite the brake caliper engages into a holding shoe.

23. The brake lining assembly as claimed in claim 16, wherein end regions of the lining holding bracket are configured such that they are type-dedicated or customer-specific.

24. The brake lining assembly as claimed in claim 16, wherein the lining holding bracket is configured as a flat part.

25. The brake lining assembly as claimed in claim 16, wherein end regions of the lining holding bracket are connected by multiple holding springs to the brake linings.

26. The brake lining assembly as claimed in claim 20, wherein the cold worked stop is a stamped stop.

27. The brake lining assembly as claimed in claim 25, wherein the end regions are connected by the holding springs to the lining carriers for the brake linings.

28. The brake lining assembly as claimed in claim 23, wherein each holding spring is connected by a mechanical connecting element to one of the lining carriers of the brake linings.

29. The brake lining assembly as claimed in claim 16, wherein the lining holding bracket is provided with identification in the form of letter and/or number combinations and/or symbols.

30. The brake lining assembly as claimed in claim 16, wherein one of the brake linings is guided so that it can move relative to the other.

31. The brake lining assembly as claimed in claim 1, wherein the attachment formed by the holding spring is carried by and displaceable along an outermost lining holding bracket surface.

32. The brake lining assembly as claimed in claim 16, wherein the attachment formed by the holding spring is carried by and displaceable along an outermost lining holding bracket surface.

* * * * *